(12) United States Patent
Stultz et al.

(10) Patent No.: US 9,478,930 B1
(45) Date of Patent: Oct. 25, 2016

(54) WALK-OFF PUMP COUPLER

(71) Applicant: RAYTHEON COMPANY, Waltham, MA (US)

(72) Inventors: Robert Stultz, Cypress, CA (US); Brian Boland, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/840,262

(22) Filed: Aug. 31, 2015

(51) Int. Cl.
*H01S 3/067* (2006.01)
*G02B 27/28* (2006.01)
*H01S 3/094* (2006.01)

(52) U.S. Cl.
CPC ....... *H01S 3/094073* (2013.01); *G02B 27/283* (2013.01); *H01S 3/06754* (2013.01); *H01S 3/094003* (2013.01)

(58) Field of Classification Search
CPC ..................... H01S 3/094073; H01S 3/06754; G02B 27/283
See application file for complete search history.

(56) References Cited

U.S. PATENT DOCUMENTS

| | | | | |
|---|---|---|---|---|
| 2002/0109918 A1* | 8/2002 | Wu | ...................... | G02B 6/2773 359/489.09 |
| 2003/0133180 A1* | 7/2003 | Yang | ................. | H01S 3/094003 359/341.3 |
| 2004/0264830 A1* | 12/2004 | Rong | .................... | G02B 6/2713 385/11 |
| 2006/0109875 A1* | 5/2006 | Matsushita | ............. | H01S 5/146 372/29.02 |
| 2011/0261456 A1* | 10/2011 | Raab | .................... | G02B 27/283 359/489.08 |

* cited by examiner

*Primary Examiner* — Eric Bolda
(74) *Attorney, Agent, or Firm* — Lando & Anastasi, LLP

(57) ABSTRACT

Method and apparatus for beam coupling. In one example, a beam coupler includes a first beam displacer configured to receive a linearly-polarized signal seed having a first wavelength, and an unpolarized pump beam having a second wavelength, the unpolarized pump beam including first and second linear polarization components, the first beam displacer being further configured to spatially translate the first linear polarization component to co-locate the first linear polarization component with the linearly-polarized signal seed, a second beam displacer configured to spatially translate the second linear polarization component and recombine the first and second linear polarization components of the unpolarized pump beam, and to co-locate the unpolarized pump beam with the linearly polarized signal seed, and a dual-wavelength waveplate interposed between the first and second beam displacer, and configured to rotate polarizations of each of the first linear polarization component, second linear polarization component, and linearly-polarized signal seed.

21 Claims, 3 Drawing Sheets

WALK-OFF PUMP COUPLER

BACKGROUND

Optical beam couplers have a wide variety of applications throughout scientific, industrial, medical, and military fields. For example, pump and signal beams of different wavelengths frequently must be launched into waveguide amplifier media (e.g., a planar-waveguide (PWG) or an optical fiber) simultaneously. All-glass pump couplers, in which the pump input, signal input, and amplifier waveguides, are spliced or fused together, are efficient and robust when employed. However, all-glass pump couplers are not always feasible. For example, all-glass pump couplers may not be used between fiber inputs and PWGs of dissimilar materials. In such cases, the pump & signal inputs must be coupled into the amplifier waveguide via free space components. Conventional methods and systems for free-space coupling pump beams and seed signals into a fiber or planar-waveguide amplifier require one or more dichroic mirrors. This is problematic when the pump beam is unpolarized, such as when the pump beam is generated from a fiber-coupled diode laser module. This makes the dichroic mirror coating design challenging or, alternatively, requires keeping the incident pump at near-normal incidence on the dichroic mirror. The latter is generally accomplished by adding additional turning mirrors for the pump beam, which proportionately increase the size and weight of the coupling assembly. Additionally, mirror alignments are sensitive to shock, vibration, and changes in ambient temperature.

SUMMARY OF THE INVENTION

Aspects and embodiments are directed to systems and methods for co-locating a polarized beam and an unpolarized beam. In particular, embodiments include a beam coupler characterized by the absence of one or more dichroic mirrors. Accordingly, various aspects of the invention are largely insensitive to shock, vibration, changes in ambient temperature, and other environmental forces that can adversely influence system reliability.

According to one aspect, a beam coupler includes a first beam displacer having a first input end and a first output end, the first beam displacer being configured to receive at the first input end a linearly-polarized signal seed having a first wavelength, and an unpolarized pump beam having a second wavelength, the unpolarized pump beam including first and second linear polarization components, the first beam displacer being further configured to spatially translate the first linear polarization component of the unpolarized pump beam to co-locate the first linear polarization component of the unpolarized pump beam with the linearly polarized signal seed at the first output end, a second beam displacer having a second input end and a second output end, the second beam displacer being configured to spatially translate the second linear polarization component of the unpolarized pump beam and recombine the first and second linear polarization components of the unpolarized pump beam, and to co-locate the unpolarized pump beam with the linearly polarized signal seed at the second output end, and a dual-wavelength waveplate interposed between the first output end of the first beam displacer and the second input end of second beam displacer, and configured to rotate polarizations of each of the first linear polarization component, second linear polarization component, and linearly polarized signal seed.

According to one embodiment, the dual-wavelength waveplate is further configured to rotate the polarizations of each of the first linear polarization component and second linear polarization component by approximately 90 degrees and rotate the polarization of the linearly-polarized signal seed by approximately 180 degrees In one embodiment, the first beam displacer is further configured to receive the linearly-polarized signal seed and the unpolarized pump beam at a collinear propagation direction and the second beam displacer is further configured to preserve the collinear propagation direction at the second output end.

In one embodiment, the first beam displacer includes a beam displacer crystal having a crystal optic axis tilted in a first direction relative to a propagation direction of the linearly-polarized signal seed. In a further embodiment, the second beam displacer includes a beam displacer crystal having a crystal optic axis tilted in a second direction relative to the direction of the linearly-polarized signal seed.

According to one embodiment, each of the first and second beam displacers includes an anisotropic crystal. In one embodiment, the first input end of the first beam displacer is configured to receive the unpolarized pump beam at a first entry and receive the linearly-polarized signal seed at a second entry, the first entry being spatially separated from the second entry. In a further embodiment, the first beam displacer is defined by a length, a width, a height, and a first walk-off angle, and wherein the length is defined proportionate to at least the first walk-off angle.

In one embodiment, the dual-wavelength waveplate includes a first material and a second material. According to one embodiment, the first material includes quartz and the second material includes sapphire. According to one embodiment, the first material includes a coefficient of thermally induced change in birefringence substantially opposite the second material. According to one embodiment, the first material includes a wavelength dispersion of birefringence substantially opposite the second material. In at least one embodiment, the beam coupler further includes a lens system configured to couple the co-located unpolarized pump beam and linearly-polarized signal seed into a waveguide.

According to one aspect, a method of co-locating collinear beams of different wavelengths may include propagating a linearly-polarized signal seed at a first wavelength and an unpolarized pump beam at a second wavelength through a first beam displacer, spatially separating the unpolarized pump beam into a first linear polarization component and a second linear polarization component during propagation of the unpolarized pump beam through the first beam displacer to co-locate the first linear polarization component with the linearly-polarized signal seed at an output end of the first beam displacer, rotating a polarization of the first linear polarization component and a polarization of the second linear polarization component by a first amount, rotating a polarization of the linearly-polarized signal seed by a second amount, propagating the linearly-polarized signal seed, the first linear polarization component, and the second linear polarization component through a second beam displacer, and spatially recombining the first and second linear polarization components during propagation of the first and second linear polarization components through the second beam displacer to co-locate the unpolarized pump beam with the linearly-polarized signal seed at an output end of the second beam displacer.

In one embodiment, rotating the polarization of the first linear polarization component and the polarization of the second linear polarization component by the first amount includes rotating the polarization of the first linear polarization component by approximately 90 degrees and rotating the polarization of the second linear polarization component by approximately 90 degrees. According to one embodiment, rotating the polarization of the linearly-polarized signal seed by the second amount includes rotating the polarization of the linearly-polarized signal seed by approximately 180 degrees.

In one embodiment the method may include transmitting the co-located linearly-polarized signal and unpolarized pump beam to a planar waveguide. According to one embodiment, spatially separating the unpolarized pump beam into the first linear polarization component and the second linear polarization component includes walking-off the first linear polarization component at a first walk-off angle relative to a propagation direction of the second linear polarization component through the first beam displacer. In one embodiment, spatially recombining the first and second linear polarization components includes walking-off the second linear polarization component at a second walk-off angle relative to a propagation direction of the unpolarized pump beam through the second beam displacer.

According to one embodiment, the method may include walking-off the linearly-polarized signal seed at a walk-off angle relative to a propagation direction of the linearly-polarized signal seed through the first beam displacer when received at the first beam displacer. According to one embodiment, rotating the polarizations of the first and second linear polarization components by the first amount includes rotating the polarizations of the first and second linear polarization components by approximately 180 degrees, and wherein rotating the polarization of the linearly-polarized signal seed by the second amount includes rotating the polarization of the linearly-polarized signal seed by approximately 90 degrees.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to systems and methods for co-locating a polarized beam and an unpolarized beam. In particular, embodiments include a beam coupler characterized by the absence of one or more dichroic mirrors. Accordingly, various aspects of the invention are largely insensitive to shock, vibration, changes in ambient temperature, and other environmental forces that can adversely influence system reliability. Some prior approaches to combining unpolarized and polarized beams, such as unpolarized pump beams and linearly-polarized signal seeds include utilization of dichroic mirrors. However, these approaches generally require turning mirrors which are sensitive to the disruptive forces discussed herein and increase the weight of the coupler assembly. This can be of particular concern when the system is attached to an aircraft. Furthermore, mirrors require fine tuning and precision control which can be time consuming and impractical when the coupler is in motion. These disadvantages may be avoided by the use of beam couplers disclosed herein that need not incorporate dichroic mirrors. As discussed in more detail below, beam couplers according to various embodiments include a first beam displacer, a dual-wavelength waveplate, and a second beam displacer configured to collinearly co-locate an unpolarized pump beam received at a first wavelength and a linearly-polarized signal seed received at a second wavelength.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
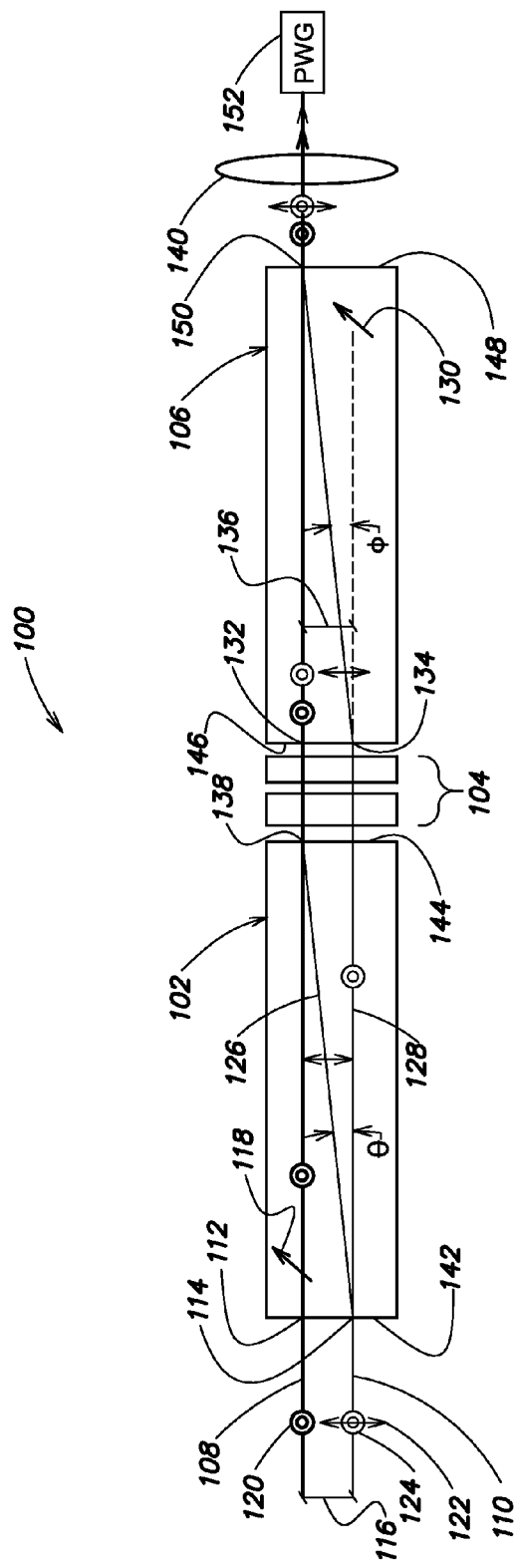
FIG. 1 is a block diagram of one example of a beam coupler according to aspects of the invention.

Referring to FIG. 1, there is illustrated a block diagram of one example of a beam coupler according to one embodiment. The beam coupler generally indicated at 100 can include a first beam displacer 102, a dual-wavelength waveplate 104, and a second beam displacer 106. In various embodiments, the beam coupler 100 is configured to receive a polarized signal having a first wavelength and an unpolarized signal having a second wavelength. In one embodiment, the polarized signal includes a linearly-polarized signal seed ("signal seed") 108, and the unpolarized signal includes an unpolarized pump beam ("pump beam") 110. As shown in FIG. 1, the linearly-polarized signal seed 108 has a linear polarization in a direction represented by indicator 120, and the unpolarized pump beam 110 has a first linear polarization in a first direction represented by indicator 122 and a second linear polarization in a second direction represented by indicator 124. In FIG. 1, the first linear polarization represents the polarization of a first linear polarization component 126 of the pump beam 110, and the second linear polarization represents the polarization of a second linear polarization component 128 of the pump beam 110. In various embodiments the linearly-polarized signal seed 108 has a wavelength of 1530 nm and the unpolarized pump beam 110 has a wavelength of 980 nm. Accordingly, the first linear polarization component 126 and second linear polarization component 128 may have a wavelength of 980 nm. Although described herein as received at wavelengths of 1530 nm and 980 nm, in various embodiments the linearly-polarized signal seed 108 and unpolarized pump beam 110 can be received at any other wavelength as conventionally used in scientific, industrial, medical, and military missions or applications. FIG. 1 shows the pump beam 110 and the linearly-polarized signal seed 108 collinearly propagating in the same direction.

Referring to FIG. 1, in various embodiments the unpolarized pump beam 110 and linearly-polarized signal seed 108 can be received at an input end 142 of the first beam displacer 102. The first beam displacer 102 is defined by a length, width, height, and walk-off angle. For example, the first beam displacer 102 can include a uniaxial walk-off crystal displacer having the dimensions 40 mm by 11 mm by 11 mm. However, the first beam displacer 102 may include a biaxial walk-off crystal displacer, and numerous other sizes may be implemented. In various embodiments, the first beam displacer 102 is composed of a first material including an optically anisotropic material. This can include a commercially available calcite crystal from Thorlabs Inc., of Newton, N.J., for example. Accordingly, the unpolarized beam received by the first beam displacer 102 (e.g., pump beam 110) is split by polarization into two linear polarization components, the first linear polarization component 126 and the second linear polarization component 128. The first beam displacer 102 can be configured such that the first linear polarization component 126 includes an extraordinary wave in the first beam displacer 102, and the second linear polarization component 128 includes an ordinary wave in the first beam displacer 102. The spatial beam profile of the first linear polarization component 126 will be increasingly translated as it propagates through the first beam displacer 102. The spatial beam profile of the second linear polarization component 128 will not translate and will propagate straight through the first beam displacer 102. As a consequence, the linear polarization components 126 and 128 become spatially separated. In one embodiment, the linearly-polarized signal-seed 108 includes an ordinary wave in the first beam displacer 102 and therefore propagates straight through the first beam displacer 102 without transverse displacement.

As shown in FIG. 1, the first beam displacer 102 can be configured to spatially translate the first linear polarization component 126 of the pump beam 110 to co-locate the first linear polarization component 126 with the linearly-polarized signal seed 108. In one embodiment, the first linear polarization component 126 and the signal seed 108 are co-located at an output 138 at an output end 144 of the first beam displacer 102. In various embodiments, the beam walk-off of the first linear polarization component 126 is at a first angle relative to the propagation direction of the second linear polarization component 128. As way of example, the first walk-off angle is shown in FIG. 1 as angle θ. The second linear polarization component 128 propagates without transverse displacement through the first beam displacer 102. In one implementation, the first walk-off angle is defined by refractive indices (i.e., $n_e$, $n_o$, and the angle subtended by the wave front normal) and an orientation of a crystal optic axis (shown as 118) of the first beam displacer 102. Accordingly, translation of the first linear polarization component 126, second linear polarization component 128, and linearly polarized signal seed 208, will depend on the polarization of the respective beam. In several embodiments, the crystal optic axis is angled within a plane containing a first entry 112 of the first beam displacer 102, a second entry 114 of the first beam displacer 102, and the output 138 at the output end 144 of the first beam displacer 102. The angle of the crystal optic axis may be chosen to maximize the walk-off angle of the first linear polarization component 126. For example, in one embodiment, the first beam displacer 102 has a crystal optic axis tilted at approximately a 45 degree angle relative to the propagation direction of the signal-seed 108. Accordingly, the received linearly-polarized signal seed 108 will propagate without transverse displacement through the first beam displacer 102. Similarly, the second linear polarization component 128 of the unpolarized pump beam 110 will propagate without transverse displacement through the first beam displacer 102. However, as a result of the polarization of the first linear polarization component 126 (i.e., extraordinary polarization), the first linear polarization component 126 of the unpolarized pump beam 120 is walked-off as it travels through the first beam displacer 102.

With continuing reference to FIG. 1, in one embodiment the signal seed 108 is received at the first entry 112 of the first beam displacer 102 and the unpolarized pump beam 110 is received at the second entry 114 of the first beam displacer 102. The second entry 112 is separated at a distance 116 from the first entry 112 in a direction opposite to a direction of walk-off of the first linear polarization component 126. In various embodiments, the distance 116 between the first entry 112 and second entry 114 is defined by the length of the first beam displacer 102 and the walk-off angle. In further embodiments, the first beam displacer 102 may be chosen based on beam size and beam divergence. For example, if the length of the first beam displacer 102 is 40 mm and the material of the first beam displacer 102 is calcite, then the distance between the first and second entry (112 and 114) is 4.2 mm. Accordingly, in one embodiment the length of a first beam displacer 102 having a known walk-off angle may be varied to co-locate the first linear polarization component 126 of the pump beam 110 and signal seed 108. Variation of the length of the first beam displacer 102 proportionately increases or decreases the transverse displacement of the first linear polarization component 126 at the output 138.

As shown in FIG. 1, the second linear polarization component 128 of the pump beam 110, the first linear polarization component 126 of the pump beam 110, and the signal seed 108, are transmitted from the output end 138 of the first beam displacer 102, where the first linear polarization component 126 and the linearly polarized signal seed 108 are co-located, to a dual-wavelength waveplate 104. In various embodiments, the dual-wavelength waveplate 104 is configured to receive two or more beams having different wavelengths. As discussed above, in some examples this can include the first and second linear polarization component (126 and 128) of the unpolarized pump beam 110 having a wavelength of 980 nm, and the linearly-polarized signal seed 108 having a wavelength of 1530 nm. In various embodiments, the dual-wavelength waveplate 104 is configured to rotate the polarization of each of the first linear polarization component 126, second linear polarization component 128, and signal seed 108. This can include producing a half-wave retardation for the pump beam 110

(i.e., the first and second linear polarization components) and a full-wave retardation for the signal seed 108. Thus, the pump beam polarization components (first linear polarization component 126 and second linear polarization component 128) "switch" polarization states as they pass through the dual-wavelength waveplate 104, while the signal seed 108 remains in the same polarization state. Accordingly, the first linear polarization component 126 of the pump beam 110 switches from an extraordinary wave in the first beam displacer 102 to an ordinary wave in the second beam displacer 106, and the second linear polarization component 128 switches from an ordinary wave in the first beam displacer 102 to an extraordinary wave in the second beam displacer 106. The signal seed 108 remains an ordinary wave in the second beam displacer 106. In one embodiment, half-wave retarding includes rotating the polarization by approximately 90 degrees and full-wave retarding includes rotating the polarization by approximately 180 degrees.

In one embodiment, the dual-wavelength waveplate 104 includes a first material and a second material. In various embodiments, the first material includes quartz and the second material includes sapphire. Known dual-wavelength waveplates are constructed from a single-material and are multiple-order, and exhibit temperature sensitivity while having a narrow spectral bandwidth. In contrast, it is appreciated that a composite-material design for the dual-wavelength waveplate 104 will improve upon both of these discussed deficiencies. Although described herein as including a first and a second material, in some embodiments the waveplate 104 may include a single material or a plurality of materials.

In one embodiment, the dual-wavelength waveplate 104 may include a first and second material constructed by selecting crystalline materials whose coefficients of thermally induced change in birefringence, $d(n_e-n_o)/dT$, differ in sign. Materials selected as having coefficients of thermally induced change in birefringence which differ in sign reduce the temperature sensitivity of the dual-wavelength waveplate 104. Similarly, in various embodiments the dual-wavelength waveplate 104 can be constructed by selecting a first and a second material whose wavelength dispersion of birefringence, $d(n_e-n_o)/d\lambda$, differ in sign, which increases the spectral bandwidth of the dual-wavelength waveplate 104.

With continuing reference to FIG. 1, in some embodiments the beam coupler generally indicated at 100 can further include a second beam displacer 106 having an input end 146 and an output end 148. As shown in FIG. 1, the second linear polarization component 128 of the pump beam 110, first linear polarization component of the pump beam 126, and signal seed 108, are transmitted from the dual-wavelength waveplate 104 to the input end 146 of the second beam displacer 106. In various embodiments, the second beam displacer 106 is configured to receive two or more beams having different wavelengths. As discussed herein, this can include the first and second linear polarization component (126 and 128) of the unpolarized pump beam 110 having a wavelength of 980 nm and the linearly-polarized signal seed 108 having a wavelength of 1530 nm.

Similar to the first beam displacer 102 discussed above, the second beam displacer 106 is defined by a length, width, height, and walk-off angle. For example, the second beam displacer 106 can include a uniaxial walk-off crystal beam displacer having the dimensions 40 mm by 11 mm by 11 mm. However, the second beam displacer 106 may include a biaxial walk-off crystal displacer, and numerous other configurations may be implemented. In various embodiments, the second beam displacer 106 is composed of a material including an optically anisotropic material. This can include a commercially available calcite crystal from Thorlabs Inc., of Newton, N.J., for example. Accordingly, the second linear polarization component 128 received at the second beam displacer 106 from the dual-wavelength waveplate is walked-off at a second walk-off angle.

As shown in FIG. 1, the second beam displacer 106 can be configured to spatially translate the second linear polarization component 128 of the pump beam 110 to recombine the first and second linear polarization components (126 and 128) of the unpolarized pump beam 110 and to co-locate the unpolarized pump beam 110 with the linearly-polarized signal seed 108 at the output 150 of the second beam displacer 106. As shown, in one example the second beam displacer 106 preserves a collinear propagation direction of the pump beam 110 and signal seed 108 received at the input end 142 of the first beam displacer 102. In various embodiments, the spatial beam profile of the second linear polarization component 128 will be increasingly translated as it propagates through the second beam displacer 106. The second linear polarization component 128 will walk-off at a second walk-off angle relative to the propagation direction of the unpolarized pump beam 110 (shown as ghost line in FIG. 1). As way of example, the second walk-off angle is shown in FIG. 1 as angle $\phi$. The second walk-off angle of the second linear polarization component 128 is defined by the refractive indices (i.e., $n_e$, $n_o$, and the angle subtended by the wave front normal) and an orientation of the crystal optic axis (shown as 130) of the second beam displacer 106. Accordingly, translation of the first linear polarization component 126, second linear polarization component 128, and linearly polarized signal seed 208, through the second beam displacer 106 will depend on the polarization of the respective beam. In several embodiments, the crystal optic axis is angled within a plane containing a first entry 132 of the second beam displacer 106, a second entry 134 of the second beam displacer 106, and the output 150 at the output end 148 of the second beam displacer 106. The angle of the crystal optic axis may be chosen to maximize the walk-off angle of the second linear polarization component 128. For example, in one embodiment, the second beam displacer 106 has a crystal optic axis that is tilted at an angle of approximately 45 degrees relative to the propagation direction of the signal seed 108. Accordingly, the received linearly-polarized signal seed 108 and first linear polarization component 126 will propagate without transverse displacement through the second beam displacer 106. However, as a result of the polarization of the second linear polarization component 128 (i.e., extraordinary polarization) in the second beam displacer 106, the second linear polarization component 128 of the unpolarized pump beam 110 is walked-off as it travels through the second beam displacer 106.

As shown in FIG. 1, in some embodiments the crystal optic axis of the second beam displacer 106 may be substantially parallel to the crystal optic axis of the first beam displacer 102. For example, the first beam displacer 102 may be composed of the same crystalline material as the second beam displacer 106, and the orientation of the first crystal optic axis (shown as 118) may be the same as the orientation of the second crystal optic axis (shown as 130). In these embodiments, the first walk-off angle $\theta$ is substantially equal to the second walk-off angle $\phi$.

With continuing reference to FIG. 1, in one embodiment the co-located signal seed 108 and first linear polarization component 126 are received at the first entry 132 of the second beam displacer 106. The second linear polarization component 128 is received at the second entry 134 of the second beam displacer 106 separated at a distance 136 from the first entry 132 in a direction opposite to the direction of walk-off of the second linear polarization component 128. In various embodiments, the distance 136 between the first entry 132 and second entry 134 is defined by the length of the second beam displacer 106 and the second walk-off angle ϕ. For example, if the second beam displacer is composed of calcite, the crystal optic axis is oriented for maximum walk-off angle, and the length of the second beam displacer 106 is 40 mm, then the distance 136 between the first and second entry (132 and 134) is approximately 4.2 mm. Accordingly, in one embodiment the length of a second beam displacer 106 having a known walk-off angle may be varied to recombine the first and second linear polarization components (126 and 128) of the unpolarized pump beam 110 and to co-locate the unpolarized pump beam 110 with the linearly-polarized signal seed 108 at the output 150 of the second beam displacer 106. Variation of the length of the second beam displacer 106 proportionately increases or decreases the transverse displacement of the second linear polarization component 128 at the output 150.

In some embodiments, the recombined first and second linear polarization components (126 and 128) of the unpolarized pump beam 110 co-located with the linearly polarized signal seed 108 at the output of the second beam displacer 106 are transmitted from the output end 148 of the second beam displacer 106. In various embodiments, this can include transmitting to an optical amplifier, such as planar waveguide (PWG) 152. A lens system 140 having one or more lenses may be used to concentrate the combined pump and signal light into a waveguide amplifier.

Figure 2:
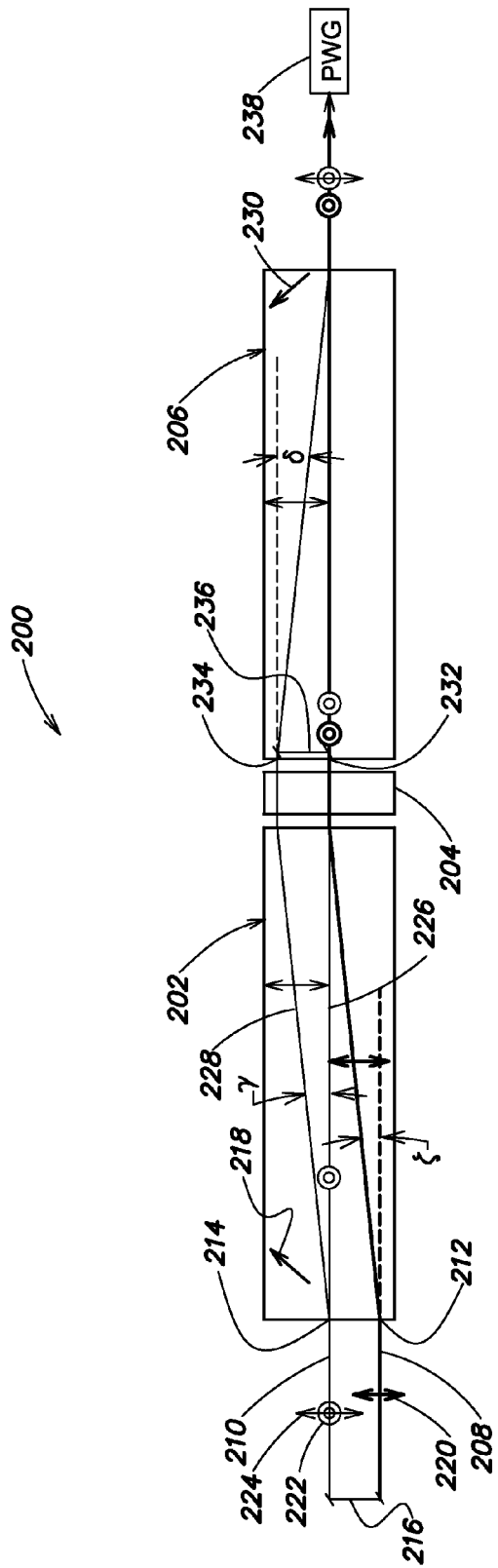
FIG. 2 is a block diagram of another example of a beam coupler according to aspects of the invention.

Referring now to FIG. 2, there is illustrated a block diagram of an additional example of a beam coupler according to one embodiment. The beam coupler generally indicated at 200 can include a first beam displacer 202, a dual-wavelength waveplate 204, and a second beam displacer 206. In various embodiments, the beam coupler 200 is configured to receive a linearly-polarized signal seed ("signal seed") 208 having a first wavelength, and an unpolarized pump beam ("pump beam") 210 having a second wavelength. As shown in FIG. 2, the signal seed 208 has a linear polarization in a direction represented by indicator 220, and the pump beam 210 has a first linear polarization in a first direction represented by indicator 222 and a second linear polarization in a second direction represented by indicator 224. In FIG. 2, as in FIG. 1, the first linear polarization represents the polarization of the first linear polarization component 226 of the pump beam 210, and the second linear polarization represents the polarization of a second linear polarization component 228 of the pump beam 210. In various embodiments, the linearly-polarized signal seed 208 has a wavelength of 1530 nm and the unpolarized pump beam 210 has a wavelength of 980 nm. Accordingly, the first linear polarization component 226 and second linear polarization component 228 may have a wavelength of 980 nm. Although described herein as received at wavelengths of 1530 nm and 980 nm, in various embodiments the linearly-polarized signal seed 208 and unpolarized pump beam 210 can be received at any other wavelength as conventionally used in scientific, industrial, medical, and military missions or applications.

In various embodiments the unpolarized pump beam 210 and linearly-polarized signal seed 208 can be received at an input end of the first beam displacer 202. The first beam displacer 202 is defined by a length, width, height, and walk-off angle. For example, the first beam displacer 202 can include a uniaxial walk-off crystal displacer having the dimensions 40 mm by 11 mm by 11 mm. However, the first beam displacer 202 may include a biaxial walk-off crystal displacer, and numerous other configurations may be implemented. In various embodiments, the first beam displacer 202 is composed of a material including an optically anisotropic material. This can include a commercially available calcite crystal from Thorlabs Inc., of Newton, N.J., for example. Accordingly, the unpolarized pump beam 210 received by the first beam displacer 202 is split into two linear polarization components by the polarization, the first linear polarization component 226 and the second linear polarization component 228. The first beam displacer 202 can be configured such that the first linear polarization component 226 includes an ordinary wave in the first beam displacer 202, and the second linear polarization component 228 includes an extraordinary wave in the first beam displacer 202. The spatial beam profile of the second linear polarization component 228 will increasingly translate as it propagates through the beam displacer crystal. The spatial beam profile of the first linear polarization component 226 will not translate and will propagate straight through the first beam displacer 202. As a consequence, the polarization components 226 and 228 will become spatially separated. In one embodiment, the linearly-polarized signal seed 208 includes an extraordinary wave in the first beam displacer 202 and will therefore increasingly translate as it propagates through the first beam displacer 202.

As shown in FIG. 2, the first beam displacer 202 can be configured to spatially translate the second linear polarization component 228 of the pump beam 210. The first beam displacer 202 may also be configured to spatially translate the linearly-polarized signal seed 208 to co-locate the signal seed 208 with the first linear polarization component 226. In one embodiment, the first linear polarization component 226 and the signal seed 208 are co-located at an output of the first beam displacer 202. In various embodiments, the beam walk-off of the second linear polarization component 228 is at a first walk-off angle relative to the propagation direction of the first linear polarization component 226. As way of example, the first walk-off angle of the second linear polarization component 228 is shown in FIG. 2 as angle γ. Similarly, the beam walk-off of the signal seed 208 is at a walk-off angle relative to the propagation direction of the signal seed when received at the first beam displacer 202 (shown as ghost line). As way of example, this angle is shown in FIG. 2 as angle c. The first linear polarization component 226 propagates without transverse displacement through the first beam displacer 202.

The first walk-off angle of the second linear polarization component 228 is defined by refractive indices (i.e., $n_e$, $n_o$, and the angle subtended by the wave front normal) and an orientation of a crystal optic axis (shown as 218) of the first beam displacer 202. Accordingly, translation of the first linear polarization component 226, second linear polarization component 228, and linearly polarized signal seed 208, will depend on the polarization of the particular beam. In several embodiments, the crystal optic axis is angled relative to a plane extending the length of the first beam displacer 202 and containing a first entry 212 of the first beam displacer 202 and a second entry 214 of the first beam displacer 202. The angle of the crystal optic axis may be chosen to maximize the walk-off angle of the second linear polarization component 228 and linearly polarized signal seed 208.

For example, in one embodiment, the first beam displacer 202 has a crystal optic axis tilted at approximately a 45 degree angle relative to the propagation direction of the first linear polarization component 226. Accordingly, the first linear polarization component 226 will propagate without transverse displacement through the first beam displacer 202. However, as a result of the polarizations of the second linear polarization component 228 and signal seed 208, the second linear polarization component 228 of the unpolarized pump beam 210 and linearly-polarized signal seed 208 (i.e., extraordinary polarization) are walked-off as they travel through the first beam displacer 202.

With continuing reference to FIG. 2, in one embodiment the signal seed 208 is received at the first entry 212 of the first beam displacer 202 and the unpolarized pump beam 210 is received at the second entry 214 of the first beam displacer 202 separated at a distance 216 from the first entry 212 in a direction opposite to the direction of walk-off of the second linear polarization component 228. In various embodiments, the distance 216 between the first entry 212 and second entry 214 is defined by the length of the first beam displacer 202 and the walk-off angle. In further embodiments, first beam displacer 202 may be chosen based on beam size and beam divergence. For example, if the length of the first beam displacer 202 is 40 mm and the material of the first beam displacer 202 is calcite, then the distance 216 between the first and second entry is (212 and 214) 4.2 mm. Accordingly, in one embodiment the length of the first beam displacer having a known walk-off angle may be varied to co-locate the first linear polarization component 226 of the pump beam 210 and the signal seed 208. Variation of the length of the first beam displacer 202 proportionately increases or decreases the transverse displacement of the second linear polarization component 228 and signal seed 208.

As shown in FIG. 2, the second linear polarization component 228, the first linear polarization component 226, and the signal seed 208, are transmitted from the output end of the first beam displacer 202 to a dual-wavelength waveplate 204, similar to the example discussed above with reference to FIG. 1. In various embodiments, the dual-wavelength waveplate 204 is configured to rotate the polarization of each of the first linear polarization component 226, second linear polarization component 228, and signal seed 208. This can include producing a half-wave retardation for the signal seed 208 and a full-wave retardation for the pump beam 210 (i.e., the first and second linear polarization component), as discussed above. In one embodiment, half-wave retarding includes rotating the polarization by approximately 90 degrees and full-wave retarding includes rotating the polarization by approximately 180 degrees. The pump beam polarization components (first linear polarization component 226 and second linear polarization component 228) remain in the same polarization states while the signal seed 208 switches polarization state. Accordingly, the signal seed 208 switches from an extraordinary wave in the first beam displacer 202 to an ordinary wave in the second beam displacer 206. The first linear polarization component 226 remains an ordinary wave in the second beam displacer 206 and the second linear polarization component 228 remains an extraordinary wave in the second beam displacers 206.

As discussed above with reference to the dual-wavelength waveplate 104 shown in FIG. 1, in some embodiments, the dual-wavelength waveplate 204 includes a first material and a second material. Although described herein as including a first and a second material, in some embodiments the waveplate 204 may include a single material or a plurality of materials including three or more. In one embodiment, the dual-wavelength waveplate 204 may include a first and second material constructed by selecting crystalline materials whose coefficients of thermally induced change in birefringence, $d(n_e-n_o)/dT$, differ in sign. Materials selected as having coefficients of thermally induced change in birefringence which differ in sign reduce the temperature sensitivity of the dual-wavelength waveplate 204. Similarly, in various embodiments the dual-wavelength waveplate can be constructed by selecting a first and a second material whose wavelength dispersion of birefringence, $d(n_e-n_o)/d\lambda$, differ in sign, which increases the spectral bandwidth of the dual-wavelength waveplate 204.

With continuing reference to FIG. 2, in some embodiments the beam coupler generally indicated at 200 further includes a second beam displacer 206 having an input end and an output end. As shown in FIG. 2, the second linear polarization component 228, first linear polarization component 226, and signal seed 208, are transmitted from the dual-wavelength waveplate 204 to the input end of the second beam displacer 206. Similar to the first beam displacer 202 discussed above, the second beam displacer 206 is defined by a length, width, height, and walk-off angle. For example, the second beam displacer 206 can include a uniaxial walk-off crystal displacer having the dimensions 40 mm by 11 mm by 11 mm. However, the second beam displacer 206 may include a biaxial walk-off crystal displacer, and numerous other sizes may be implemented. In various embodiments, the second beam displacer 206 includes an optically anisotropic material. This can include a commercially available calcite crystal from Thorlabs Inc., of Newton, N.J., for example. Accordingly, the second linear polarization component 228 received from the dual-wavelength waveplate is walked-off at a second walk-off angle.

As shown in FIG. 2, the second beam displacer 206 can be configured to spatially translate the second linear polarization component 228 of the pump beam 210 to recombine the first and second linear polarization components (226 and 228) and to co-locate the unpolarized pump 210 beam with the linearly-polarized signal seed 208 at the output of the second beam displacer 206. In various embodiments, the spatial beam profile of the second linear polarization component 228 will be increasingly translated as it propagates through the second beam displacer 206. The second polarization component may be walked-off at the second walk-off angle relative to propagation of the second linear polarization component 228 and received at the input end of the second beam displacer 206 (shown as ghost line in FIG. 2). As way of example, the second walk-off angle is shown in FIG. 2 as angle δ. The second walk-off angle of the second linear polarization component 228 may be defined by the refractive indices (i.e., $n_e$, $n_o$, and the angle subtended by the wave front normal) and an orientation of the crystal optic axis (shown as 230) of the second beam displacer 206. Accordingly, translation of the first linear polarization component 226, second linear polarization component 228, and linearly polarized signal seed 208, through the second beam displacer 206 will depend on the polarization of the particular beam. In several embodiments, the crystal optic axis is angled relative to a plane extending the length of the second beam displacer 206 and containing a first entry 232 of the second beam displacer 206 and the output of the second beam displacer 206.

For example, in one embodiment, the second beam displacer 206 has a crystal optic axis that is tilted at an angle of approximately 45 degrees relative to the propagation direction of the signal seed 208. Accordingly, the received linearly-polarized signal seed 208 and first linear polarization component 226 will propagate without transverse displacement through the second beam displacer 206. However, the second linear polarization component 228 of the unpolarized pump beam 210 is walked-off as it travels through the second beam displacer.

Referring to FIG. 2, the second beam displacer 206 is shown as including a crystal optic axis having an orientation in a direction indicated by arrow 230. As shown in FIG. 2, in some embodiments the crystal optic axis of the second beam displacer 206 may be substantially orthogonal to the crystal axis of the first beam displacer 202. In some embodiments the first beam displacer 202 may be composed of the same crystalline material as the second beam displacer 206 and the orientation of first crystal optic axis may be the same as the orientation of second crystal optic axis 130. In these embodiments, the walk-off angles $\gamma$, $\xi$, and $\delta$ are all approximately equal in magnitude (but not in sign).

With continuing reference to FIG. 2, in one embodiment the signal seed 208 and co-located first linear polarization component 226 are received at a first entry 232 of the second beam displacer 206, and the second linear polarization component 228 of the pump beam 210 is received at a second entry 234 of the second beam displacer 206 separated at a distance 236 from the first entry 232 in a direction opposite to the direction of walk-off of the second linear polarization component 228. In various embodiments, the distance between the first entry 232 and second entry 234 is defined by the length and walk-off angle of the second beam displacer 206. For example, if the second beam displacer 206 is composed of calcite, the crystal optical axis is oriented for maximum walk-off angle, and the length of second beam displacer 106 is 40 mm, then the distance between the first and second entry will be approximately 4.2 mm. Accordingly, in one embodiment the length of the second beam displacer 206 having a known walk-off angle may be varied to recombine the first and second linear polarization components (226 and 228) of the unpolarized pump beam 210 and to co-locate the unpolarized pump beam 210 with the linearly polarized signal seed 208 at the output of the second beam displacer 206. Variation of the length of the second beam displacer 206 proportionately increases or decreases the transverse displacement of the second linear polarization component 228.

In some embodiments, the recombined first and second linear polarization components (226 and 228) of the unpolarized pump beam 210 co-located with the linearly polarized signal seed 208 at the output of the second beam displacer 206 are transmitted from the output end of the second beam displacer 206. In various embodiments, this can include transmitting to an optical amplifier, such as PWG 238. One or more lenses, such as the lens system 140 shown in FIG. 1, may be used to concentrate the combined pump and signal light into a waveguide amplifier.

Figure 3:
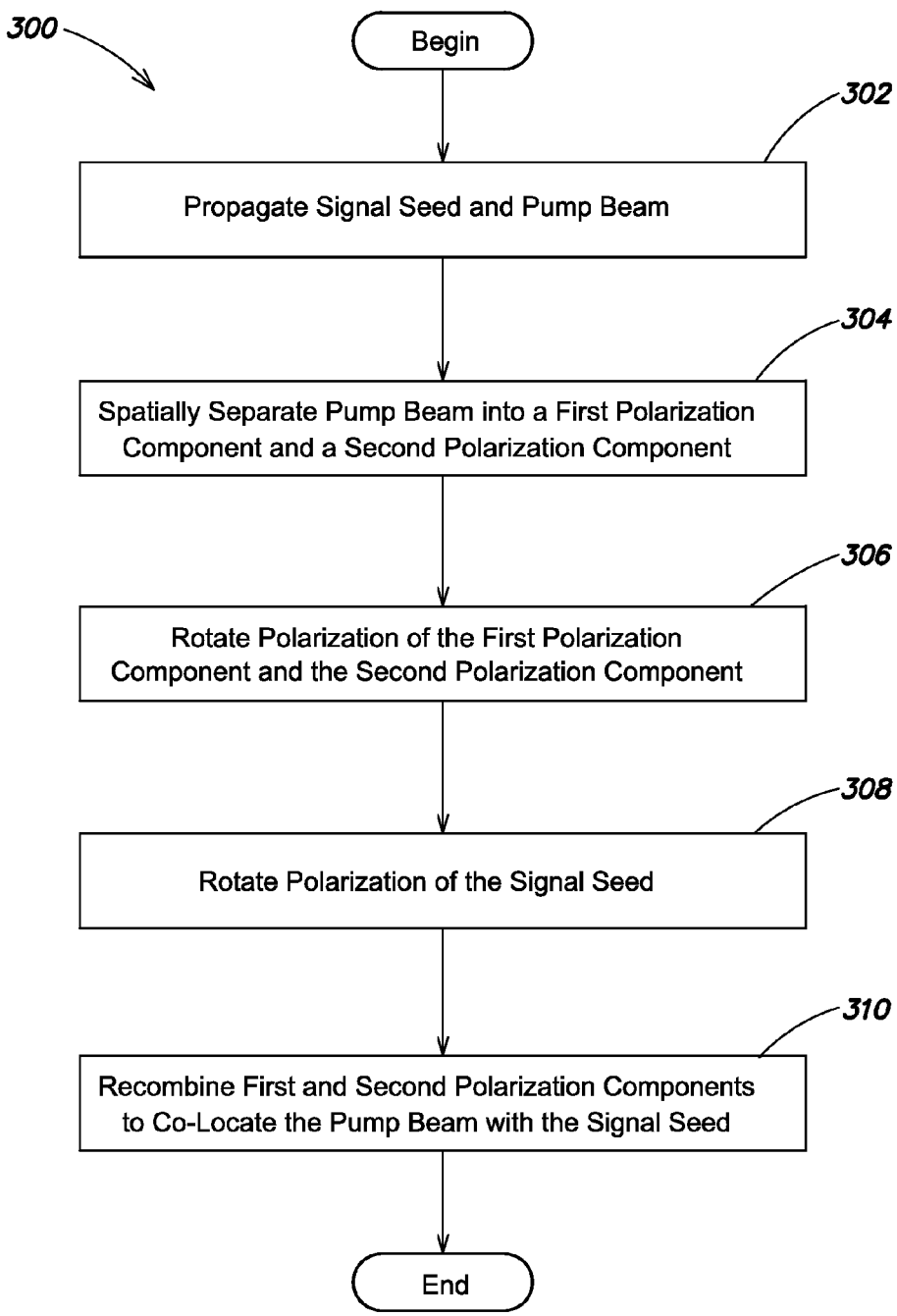
FIG. 3 is a process flow of one example of a method for co-locating beams according to aspects of the invention.

As described above with reference to FIGS. 1 and 2, several embodiments perform processes that co-locate an unpolarized pump beam and linearly-polarized signal seed. In some embodiments, these processes are executed by a beam coupler, such as the beam coupler 100 described above with reference to FIG. 1 or the beam coupler 200 described with reference to FIG. 2. One example of such as process is illustrated in FIG. 3. According to this example, process 300 includes acts of propagating a signal seed and a pump beam; spatially separating the pump beam into a first linear polarization component and a second linear polarization component; rotating the polarization of the first linear polarization component and the second linear polarization component; rotating the polarization of the signal seed; and recombining the first and second linear polarization components to co-locate the pump beam with the signal seed.

In act 302, the process can include propagating a linearly-polarized signal seed ("signal seed") at a first wavelength and an unpolarized pump beam ("pump beam") at a second wavelength through a first beam displacer. As discussed above, in various embodiments the signal seed has a linear polarization in a first direction, and the pump beam has a first linear polarization in a first direction and a second linear polarization in a second direction. The first linear polarization component represents the polarization of a first linear polarization component of the pump beam and the second linear polarization represents the polarization of a second linear polarization of the pump beam. Also, in various embodiments the linearly-polarized signal seed has a wavelength of 1530 nm and the unpolarized pump beam has a wavelength of 980 nm; however, various other wavelengths may be used, as discussed above. In various embodiments, the process further includes receiving the transmitted polarized pump beam and linearly-polarized signal seed at an input end of the first beam displacer, such as beam displacer 102 described above with reference to FIG. 1 or beam displacer 202 described above with reference to FIG. 2.

In act 304, the process can include spatially separating the unpolarized pump beam into the first linear polarization component and the second linear polarization component during propagation of the unpolarized pump beam through the first beam displacer to co-locate the first linear polarization component with the linearly-polarized signal seed at an output end of the first beam displacer. In one embodiment, the first linear polarization component and the signal seed are co-located at an output of the first beam displacer. In various embodiments, this includes increasingly translating the first linear polarization component at a walk-off angle relative to a propagation direction of the second linear polarization component. In other embodiments, this may include increasingly translating the second linear polarization component at walk-off angle relative to a propagation direction of the first linear polarization component and increasingly translating the linearly-polarized signal seed at walk-off angle relative to a propagation direction of the signal seed when received at the first beam displacer. Accordingly, the first linear polarization component, second linear polarization component, or linearly polarized signal seed may be walked-off as a spatial beam profile of the respective component or seed propagates through the first beam displacer.

As discussed above with reference to FIGS. 1 and 2, the walk-off angle of the first linear polarization component, second linear polarization component, or signal seed, may be defined by the refractive indices and an orientation of a crystal optic axis of the first beam displacer. For example, in one embodiment, the first beam displacer has a crystal optic axis tilted at approximately a 45 degree angle relative to the propagation direction of the signal seed. Accordingly, the received linearly-polarized signal seed will propagate without transverse displacement through the first beam displacer (when polarized as an ordinary wave). Similarly, the second linear polarization component of the unpolarized pump beam will propagate without transverse displacement through the first beam displacer (when polarized as an ordinary wave). However, as a result of the polarization of the first linear polarization component (i.e., extraordinary polarization), the first linear polarization component of the unpolarized pump beam is walked-off. In other embodiments, the first beam displacer has a crystal optic axis tilted at approximately a 45 degree angle relative to the propagation direction of the first linear polarization component of the pump beam (and is polarized as an extraordinary wave).

Accordingly, the first linear polarization component will propagate without transverse displacement through the first beam displacer. However, as a result of the polarization of the second linear polarization component and signal seed, the second linear polarization component of the unpolarized pump beam and linear polarized signal seed are walked-off. In various embodiments, the process may also include transmitting the second linear polarization component of the pump beam, first linear polarization component of the pump beam, and signal seed from the output end of the first beam displacer to a dual-wavelength waveplate.

In act 306 the process can include rotating a polarization of the first linear polarization component and a polarization of the second linear polarization component by a first amount. In act 308, the process can include rotating a polarization of the linearly-polarized signal seed by a second amount. In various embodiments, the dual-wavelength waveplate is configured to rotate the polarization of each of the first linear polarization component, second linear polarization component, and signal seed. This can include producing a half-wave retardation for the pump beam (i.e., the first and second linear polarization component) and a full-wave retardation for the signal seed. This may alternatively include producing a half-wave retardation for the signal seed and a full-wave retardation for the pump beam. In one embodiment, half-wave retarding includes rotating the polarization by approximately 90 degrees and full-wave retarding includes rotating the polarization by approximately 180 degrees. As a result, the pump beam polarization components (first linear polarization component and second linear polarization component) and signal seed may "switch" polarization states or remain in the same state. In some embodiments, the process may include transmitting the second linear polarization component of the pump beam, first linear polarization component of the pump beam, and signal seed from the dual-wavelength waveplate to a second beam displacer.

In act 310 the process can include spatially recombining the first and second linear polarization components during propagation of the first and second linear polarization components through a second beam displacer to co-locate the unpolarized pump beam with the linearly-polarized signal seed at an output end of the second beam displacer. In various embodiments, this includes increasingly translating the second linear polarization component at a second walk-off angle relative to a propagation direction of the first linear polarization component. In other embodiments, this can include increasingly translating the second linear polarization component at a second walk-off angle relative to a propagation direction of the second linear polarization component received at the input end of the second beam displacer. The second walk-off angle of the second linear polarization component may be defined by refractive indices and a crystal optic axis of the second beam displacer. In various embodiments, the second beam displacer has a crystal optic axis that is tilted in a plane perpendicular to the polarization of the linearly-polarized signal seed and at an angle of approximately 45 degrees relative to propagation direction of the signal seed. Accordingly, the received linearly-polarized signal seed and first linear polarization component will propagate without transverse displacement through the second beam displacer. However, as a result of the polarization of the second linear polarization component, the second linear polarization component of the unpolarized pump beam is walked-off.

In some embodiments, the recombined first and second linear polarization components of the unpolarized pump beam co-located with the linearly polarized signal seed at the output of the second beam displacer are transmitted from the output end of the second beam displacer. In various embodiments, this can include transmitting to an optical amplifier, such as a PWG, through one or more lenses.

Thus, aspects and embodiments provide beam couplers, and methods involving the use of such beam couplers, that co-locate a polarized beam and an unpolarized beam (such as a signal seed and pump beam in certain embodiments) without requiring the use of dichroic mirrors. Instead, a pair of beam displacers in combination with a dual-wavelength waveplate can be used to spatially displace the beams so as to co-locate at an output of the beam coupler as discussed above. As will be appreciated by those skilled in the art, given the benefit of this disclosure, the dimensions and/or materials of the beam displacers may be selected depending on the wavelengths of the signal seed and pump beam, and the initial separation distance between the signal seed and the pump beam, for example, so as to achieve co-location of the two beams at the output.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A beam coupler comprising:
   a first beam displacer having a first input end and a first output end, the first beam displacer being configured to receive at the first input end a linearly-polarized signal seed having a first wavelength, and an unpolarized pump beam having a second wavelength, the unpolarized pump beam including first and second linear polarization components, the first beam displacer being further configured to spatially translate the first linear polarization component of the unpolarized pump beam to co-locate the first linear polarization component of the unpolarized pump beam with the linearly-polarized signal seed at the first output end;
   a second beam displacer having a second input end and a second output end, the second beam displacer being configured to spatially translate the second linear polarization component of the unpolarized pump beam and recombine the first and second linear polarization components of the unpolarized pump beam, and to co-locate the unpolarized pump beam with the linearly-polarized signal seed at the second output end; and
   a dual-wavelength waveplate interposed between the first output end of the first beam displacer and the second input end of second beam displacer, and configured to rotate polarizations of each of the first linear polarization component, second linear polarization component, and linearly-polarized signal seed.

2. The beam coupler of claim 1, wherein the dual-wavelength waveplate is further configured to rotate the polarizations of each of the first linear polarization component and second linear polarization component by approximately 90 degrees and rotate the polarization of the linearly-polarized signal seed by approximately 180 degrees.

3. The beam coupler of claim 1, wherein the first beam displacer is further configured to receive the linearly-polarized signal seed and the unpolarized pump beam at a collinear propagation direction and the second beam displacer is further configured to preserve the collinear propagation direction at the second output end.

4. The beam coupler of claim 1, wherein the first beam displacer includes a beam displacer crystal having a crystal optic axis tilted in a first direction relative to a direction of propagation of the linearly-polarized signal seed.

5. The beam coupler of claim 4, wherein the second beam displacer includes a beam displacer crystal having a crystal optic axis tilted in a second direction relative to the direction of propagation of the linearly-polarized signal seed.

6. The beam coupler of claim 1, wherein each of the first and second beam displacers includes an anisotropic crystal.

7. The beam coupler of claim 1, wherein the first input end of the first beam displacer is configured to receive the unpolarized pump beam at a first entry and receive the linearly-polarized signal seed at a second entry, the first entry being spatially separated from the second entry.

8. The beam coupler of claim 7, wherein the first beam displacer is defined by a length, a width, a height, and a first walk-off angle, and wherein the length is defined proportionate to at least the first walk-off angle.

9. The beam coupler of claim 1, wherein the dual-wavelength waveplate includes a first material and a second material.

10. The beam coupler of claim 9, wherein the first material includes quartz and the second material includes sapphire.

11. The beam coupler of claim 9, wherein the first material includes a coefficient of thermally induced change in birefringence substantially opposite the second material.

12. The beam coupler of claim 9, wherein the first material includes a wavelength dispersion of birefringence substantially opposite the second material.

13. The beam coupler of claim 1, further comprising a lens system configured to couple the co-located unpolarized pump beam and linearly-polarized signal seed into a waveguide.

14. A method of co-locating collinear beams of different wavelengths, the method comprising:
propagating a linearly-polarized signal seed at a first wavelength and an unpolarized pump beam at a second wavelength through a first beam displacer;
spatially separating the unpolarized pump beam into a first linear polarization component and a second linear polarization component during propagation of the unpolarized pump beam through the first beam displacer to co-locate the first linear polarization component with the linearly-polarized signal seed at an output end of the first beam displacer;
rotating a polarization of the first linear polarization component and a polarization of the second linear polarization component by a first amount;
rotating a polarization of the linearly-polarized signal seed by a second amount;
propagating the linearly-polarized signal seed, the first linear polarization component, and the second linear polarization component through a second beam displacer; and
spatially recombining the first and second linear polarization components during propagation of the first and second linear polarization components through the second beam displacer to co-locate the unpolarized pump beam with the linearly-polarized signal seed at an output end of the second beam displacer.

15. The method of claim 14, wherein rotating the polarization of the first linear polarization component and the polarization of the second linear polarization component by the first amount includes rotating the polarization of the first linear polarization component by approximately 90 degrees and rotating the polarization of the second linear polarization component by approximately 90 degrees.

16. The method of claim 15, wherein rotating the polarization of the linearly-polarized signal seed by the second amount includes rotating the polarization of the linearly-polarized signal seed by approximately 180 degrees.

17. The method of claim 14, further comprising transmitting the co-located linearly-polarized signal seed and unpolarized pump beam to a planar waveguide.

18. The method of claim 14, wherein spatially separating the unpolarized pump beam into the first linear polarization component and the second linear polarization component includes walking-off the first linear polarization component at a first walk-off angle relative to a propagation direction of the second linear polarization component through the first beam displacer.

19. The method of claim 18, wherein spatially recombining the first and second linear polarization components includes walking-off the second linear polarization component at a second walk-off angle relative to a propagation direction of the unpolarized pump beam through the second beam displacer.

20. The method of claim 14, further comprising walking-off the linearly-polarized signal seed at a walk-off angle relative to a propagation direction of the linearly-polarized signal seed through the first beam displacer when received at the first beam displacer.

21. The method of claim 20, wherein rotating the polarizations of the first and second linear polarization components by the first amount includes rotating the polarizations of the first and second linear polarization components by approximately 180 degrees, and wherein rotating the polarization of the linearly-polarized signal seed by the second amount includes rotating the polarization of the linearly-polarized signal seed by approximately 90 degrees.

* * * * *